United States Patent Office 3,291,814
Patented Dec. 13, 1966

3,291,814
NOVEL SYNTHESIS OF 19-NORSTEROIDS AND NOVEL 19-NORSTEROID INTERMEDIATES
Philip Guy Marshall, Cheadle Hulme, England, assignor to Aspro-Nicholas Limited, London, England, a British company
No Drawing. Filed Aug. 28, 1964, Ser. No. 392,906
10 Claims. (Cl. 260—397.4)

This invention is concerned with a novel synthesis of certain 19-norsteroid type compounds and with certain novel intermediates for use in the synthesis of useful 19-norsteroid type compounds.

I have discovered a new class of tetracyclic compounds which may be made quite simply by total synthesis and which may themselves be converted by synthetic methods in only a small number of stages to a variety of 19-norsteroids and steroid homologues and analogues. Hence, my discovery opens up the possibility of the economic total synthesis of useful hormone compounds hitherto obtainable only by partial synthesis from naturally-occurring steroid compounds. Furthermore, my discovery enables the synthesis of hitherto unknown but structurally related compounds by the introduction into the molecule of my new class of compound during synthesis thereof of variations on the theme thereof which may be carried through into the ultimate products, whereby those ultimate products may differ structurally in one or more respects from known 19-norsteroids whilst being in a structural sense homologous or analogous to such known compounds. In this way new homologues or analogues may be obtained which were hitherto unattainable within the limitations imposed by the structure of the naturally-occurring steroid compounds which were alone available as starting materials for making the known active 19-norsteroid compounds.

My invention also provides processes for making the versatile key intermediates of my invention, and for converting said intermediates into other desired compounds and classes of compounds.

The novel compounds of my invention have the structural formula:

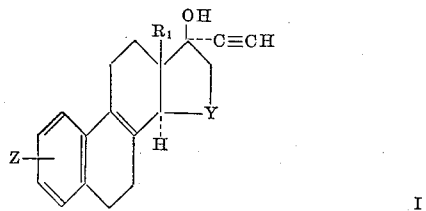

wherein Z represents in alkoxy, aralkoxy or hydroxy group or a hydrogen atom, $R_1$ represents an alkyl group and Y represents a lower alkylene group.

By proper selection of the starting materials single or multiple Z substitution may be had at the positions 1, 2, 3 and 4 of the A ring. Most commonly, Z substitution will be had at the 3-position. When Z represents an alkoxy group, it is preferred that that alkoxy group shall be a lower alkoxy group such as methoxy, ethoxy, propoxy or the like, containing up to 5 carbon atoms although alkoxy groups having up to 12, or even 20, carbon atoms may be present. The alkyl moiety of the alkoxy group may be either of straight-chain or of branched-chain structure, the former being preferred, or it may be a cycloalkyl group, such as cyclopentyl or cyclohexyl. Z may also represent an aralkoxy group, for example a phenyl (lower) alkoxy group, such as benzloxy. When Z is hydrogen, the A ring is unsubstituted. Compounds in which Z is hydroxy will normally be obtained by making a compound of Formula I in which Z is alkoxy or aralkoxy and thereafter removing the protecting alkyl or aralkyl moiety to leave an unprotected hydroxy group.

The angular 13-substituent $R_1$ will in the simplest case be methyl but, by virtue of the totally synthetic method by which the compounds of by invention may be made, $R_1$ may be a higher straight-chain or branched-chain aliphatic group such as an alkyl group having up to 12, or even 20, carbon atoms and preferably up to 5 carbon atoms, such as ethyl, n-propyl, iso-propyl, etc.

The lower alkylene group Y is advantageously a methylene group, but may instead be ethylene or even propylene. It will be appreciated that when Y is an ethylene group the compound will be a D-homo compound and that when Y is propylene the D ring will contain 7 ring carbon atoms. The size of the D ring will be dictated by the choice of starting materials, or vice versa, and thus the invention opens up the possibility of making novel D-homo and higher homologues or analogues of known 19-norsteroids.

For the sake of convenience in description, the invention will now be described by way of exemplification with reference to the simplest case, that is to say in which the compound of Formula I is such as will enable its conversion to certain known 19-norsteroids. In this case, Z is a methoxy group in the 3-position, $R_1$ is a methyl group and Y is methylene. It is, however, to be understood that no limitation upon the scope of the invention is intended hereby and that compounds in which Z, $R_1$ and Y have differing meanings may be obtained by parallel methods employing starting compounds in which the moieties to provide Z, $R_1$ and Y are suitably selected or, in the case of Z, by altering the nature thereof subsequently, as by hydrolysis as described above.

On the other hand, it is also to be understood that no admission of any equivalence is made as between compounds of Formula I, or compounds obtainable from those of Formula I, in which Z, $R_1$ and Y are 3-methoxy, methyl and methylene respectively, and compounds in which one or more of Z, $R_1$ and Y have different meanings. Hitherto, it was feasible only to make the former by the partial synthesis methods which alone were available before my invention, in view of the strict limitations imposed upon $R_1$ and Y, and upon the position of Z, by the naturally-occurring starting materials which had to be employed.

The compound of Formula I in which Z is methoxy in the 3-position, $R_1$ is methyl and Y is methylene is $\Delta^8$-dehydro-ethinyloestradiol 3-methyl ether which may be made in accordance with the invention from $\Delta^{8,14}$-bisdehydrooestrone 3-methyl ether which may itself be obtained totally synthetically by one of the methods described by Crispin and Whitehurst in Proceedings of the Chemical Society, November 1962 at page 356, and January 1963 at page 22.

In a first stage, $\Delta^{8,14}$-bisdehydrooestrone 3-methyl ether is converted to $\Delta^8$-dehydrooestrone 3-methyl ether by reduction of the 14–15 double bond, conveniently by hydrogenation catalysed by a hydrogenation catalyst such as Raney nickel, or palladium supported on calcium carbonate, the reaction proceeding at atmospheric pressure and room temperature. Amongst organic solvents which may be employed is tetrahydrofuran.

The $\Delta^8$-dehydrooestrone 3-methyl ether is then subjected to 17α-ethinylation, conveniently by the action of acetylene in solution in the presence of an ethinylation catalyst, such as an alkali metal alkoxide, preferably potassium t.-butoxide. Solvents which may be employed are ether and toluene/ether. Either a solution of the dehydrooestrone ether and catalyst may be saturated in the cold with acetylene, or a solution of the dehydro-oestrone ether may be added slowly to a prepared solution of acetylene in, for example, ether, whilst also slowly adding a solution of potassium in dry t.-butanol. In either case, when the interaction is complete the reaction medium is decomposed by the addition of, for example, a large volume of a concentrated aqueous solution of ammonium chloride, which may be acidified, whereafter the desired ethinylated product may be recovered, as by ether extraction and evaporation of the extract or by evaporation of the washed organic solvent layer, evaporation of solvent in either case preferably being effected under reduced pressure. The residual $\Delta^8$-dehydroethinyloestradiol ether may be purified by recrystallisation, and is available for a variety of further syntheses. For example, it may be converted to ethinyloestrenolone, to vinylnortestosterone or to vinyloestrenolone, and homologues or analogues thereof may be converted to the corresponding homologues or analogues of those compounds.

In accordance with a feature of the invention, the $\Delta^8$-dehydroethinyloestradiol 3-methyl ether (or Z, $R_1$ and/or 17$\alpha$- variants thereof) may be converted to 17$\alpha$-vinyloestra-2,5(10)-dien-3,17$\beta$-diol 3-enol methyl ether (or Z, $R_1$ and/or Y variants thereof) which itself is a desired intermediate for the manufacture of vinylnortestosterone and of vinyloestrenolone and the variants of which may be employed to make novel variants of those end-products. Vinyloestrenolone may more descriptively be named 17$\alpha$-vinyloestra-5(10)-en-17$\beta$-ol-3-one. This compound is known from United States Patent No. 2,983,735 which discloses that it exhibits various therapeutic activities. United States Patent No. 3,062,713 discloses that the drug has been used in humans in the treatment of dysmenorrhoea, menopausal disturbances, fecundation control in cases of hindered normal pregnancy, and in the case of women engaged in athletics when it would be advisable to delay their menstrual period.

The conversion to the vinyloestradiendiol ether in accordance with the invention is effected by acting upon the dehydroethinyloestradiol ether to reduce the 17$\alpha$-ethinyl group to a 17$\alpha$-vinyl group, reduce the 8–9 double bond and partially reduce the aromatic A ring to the enol diene. These reductions may conveniently be effected simultaneously by the action of an alkali metal amide, which may be made in situ by the action on liquid ammonia of an alkali metal, such as sodium, potassium or, preferably, lithium, or of a methyl compound thereof such as lithium methyl. After the disappearance of the alkali metal, ethanol t.-butanol is added quite slowly and, after the disappearance of the blue coloration, the ammonia is driven off or allowed to dissipate and the residue is washed with water and evaporated to dryness at a low temperature to leave a residue which is purified, as by chromatographing a solution thereof, to provide the desired product.

Vinyloestradiendiol ethers made in accordance with this invention may, in accordance with a further feature, be converted to the corresponding $\Delta^{5(10)}$-ketone, that is to say, vinyloestrenolone, by the actions of an organic acid, such as oxalic acid, conveniently in aqueous solution, on a solution of the enol diene compound in a solvent such as methanol or ethanol, at room temperature. Upon completion of the reaction, the reaction medium may be extracted with ether, if necessary after dilution with water. Evaporation of the washed and dried extracts gives the desired vinyloestrenolone, which may be recrystallised to give prisms melting at about 139° C.

The following examples of successive stages are given by way of illustration of the invention, it being understood that the meanings of Z=3-methoxy, $R_1$=methyl and Y=methylene can be varied by obtaining as the starting compound the appropriate variants of the $\Delta^{8,14}$-bisdehydrooestrone methyl ether. These may be got by methods analogous to those of Crispin and Whitehurst, using in place of their starting compounds the requisite homologues thereof comprising in their structure the groupings to provide the desired Z, $R_1$ and Y moieties.

EXAMPLE 1

$\Delta^8$-dehydrooestrone 3-methyl ether

A solution of 15 g. of $\Delta^{8,14}$-bisdehydrooestrone 3-methyl ether in 250 ml. pure tetrahydrofuran was treated with 5% palladium on calcium carbonate and hydrogenated at atmospheric pressure. Absorption of hydrogen ceased after 2–3 hours when about 1200 ml. had been absorbed. The catalyst was then filtered from the solution and the solvent evaporated therefrom under reduced pressure. The residue was recrystallised from methanol to yield 12.5 g. of colourless needles, M.P. 119–121° C. $\lambda_{max}$ 279 m$\mu$, $\epsilon_{max}$ 19,500.

EXAMPLE 2

$\Delta^8$-dehydroethinyloestradiol 3-methyl ether

Acetylene, purified by cooling to about —70° C., was passed for about 30 minutes into 250 ml. dry ether, with magnetic stirring. Then, over a period of 30 minutes there were added gradually through two separate funnels on the one hand a solution of 5 g. $\Delta^8$-dehydrooestrone 3-methyl ether (from Example 1) in 250 ml. ether, and on the other hand a solution of 5 g. potassium in 100 ml. dry t.-butanol diluted with 100 ml. ether. Stirring was then continued for a further 5 hours, and then cold saturated aqueous ammonium chloride solution added. The mixture was then extracted with successive portions of ether. The bulked ether extracts were then washed with successive portions of water until the washings were neutral. The ether extract was then dried over anhydrous magnesium sulphate and the dried extract evaporated to dryness under reduced pressure, to leave a residue weighing about 5 g. which solidified on cooling and scratching. On recrystallisation from petroleum spirit (B.P. 60–80° C.) containing acetone it had M.P. 153–154° C. $\gamma_{max}$ (CCl$_4$) 3632, 3319 cm.$^{-1}$; $\gamma_{max}$ (KBr) 1606, 1564, 1250, 1039 cm.$^{-1}$.

EXAMPLE 3

17$\alpha$-vinyloestra-2,5(10)-dien-3,17$\beta$-diol 3-enol methyl ether 300 ml. liquid ammonia (distilled from sodium) was placed under a Dry Ice condenser, and 0.4 g. lithium metal in pieces was added during 20 minutes, after which one small crystal of ferric nitrate was added and the mixture stirred mechanically until the blue coloration disappeared. A solution in 150 ml. dry ether of 3 g. $\Delta^8$-dehydroethinyloestradiol 3-methyl ether (from Example 2) was then added with stirring during 30 minutes, whereafter the reaction mixture was stirred for a further 90 minutes. To the stirred mixture was then added during 20 minutes 4 g. lithium divided into twenty pieces. After a further 30 minutes stirring, 60 ml. absolute ethanol was added and stirring continued until some 60 minutes later the blue coloration was again discharged, whereupon the stirrer was stopped and the ammonia allowed to evaporate overnight.

The reaction mixture was then diluted with ether and washed with water until the washings were neutral, whereafter the ether extract was dried over anhydrous magnesium sulphate and the ether evaporated under reduced pressure to leave some 3 g. of residual oil which was taken up in petroleum spirit (B.P. 40–60° C.) and chromatographed on a column of 150 g. of "Camag" brand alumina (Neutral, Grade III). The column was then developed, first with petroleum spirit (B.P. 40–60° C.), then with benzene, and finally with benzene containing 10% ether.

From the petroleum spirit (about 500 ml.) was obtained some 0.8 g. of the compound 17-ethylidenoestra-2,5(10)-dien-3-ol 3-enol methyl ether, in the form of parallelepipeds, M.P. 124–125° C., $\gamma_{max}$ (mull) 1690, 1670, 1224 cm.$^{-1}$.

From the benzene (about 2 litres) there was obtained by evaporation 1.2 g. 17α-vinyloestra-2,5(10)-dien-3,17β-diol 3-enol methyl ether which had M.P. 138.5–140° C. after recrystallisation in the form of prisms from petroleum spirit/acetone. $\gamma_{max}$ (mull) 3545, 1689, 1663, 1220, 1025, 943 cm.$^{-1}$.

The benzene-ether eluates yielded about 0.5 g. of the compound 17α-vinyloestra-3,17β-diol 3-methyl ether which, on recrystallisation from acetone/water, yielded needles M.P. 156–158° C. $\gamma_{max}$ (mull) 3400, 1608, 1590, 1500, 1250, 922 cm.$^{-1}$.

EXAMPLE 4

17α-vinyloestr-5(10)-en-17β-ol-3-one

To a solution of 1 g. 17α-vinyloestra-2,5(10)-dien-3,17β-diol 3-enol methyl ether (from Example 3) in 150 ml. methanol was added at room temperature a solution of 1.5 g. oxalic acid dihydrate in about 25 ml. water. The reaction was followed spectroscopically and also by thin layer chromatography. After 2 hours, water and ether were added; the ethereal layer was then separated, washed with water until the washings were neutral, dried over anhydrous magnesium sulphate, and evaporated to dryness under reduced pressure. The residue was crystallised from petroleum spirit (B.P. 60–80° C.) to give about 0.6 g. vinyloestrenolone in the form of prisms, M.P. 138–139° C. $\gamma_{max}$ (mull) 3400, 1704, 992, 931 cm.$^{-1}$.

Treatment of the vinyloestrenolone with very dilute hydrochloric acid in ethanol converts it to the corresponding conjugated ketone having the double bond in the 4(5) position, $\lambda_{max}$(ethanol) 241.5 m$\mu$, $\epsilon_{max}$ 13,500.

I claim:

1. A method of making 17α-vinyloestr-5(10)-en-17β-ol-3-one comprising acting upon a solution of a Δ$^8$-dehydrooestrone 3-enol ether with acetylene in the presence of an ethinylation catalyst to form a Δ$^8$-dehydro-17α-ethinyloestradiol 3-enol ether, acting upon said Δ$^8$-dehydro-17α-ethinyloestradiol 3-enol ether with an alkali metal and ammonia to simultaneously reduce the 17α-ethinyl group to a 17α-vinyl group, reduce the 8–9 double bond and reduce the aromatic A ring to a diene ring, and acting upon a solution of the resulting 17α-vinyloestra-2,5(10)-dien-3, 17β-diol 3-enol ether with an organic acid to form 17α-vinyloestr-5(10)-en-17β-ol-3-one.

2. A method as claimed in claim 1, wherein the ethinylation catalyst is an alkali metal alkoxide.

3. A method as claimed in claim 2, wherein the alkali metal alkoxide is potassium t-butoxide.

4. A method as claimed in claim 1, wherein said Δ$^8$-dehydro-17α-ethinyloestradiol 3-enol ether is reduced by adding an alkali metal and liquid ammonia to a solution thereof to form an alkali metal amide in situ, followed by adding ethanol or t-butanol.

5. A method as claimed in claim 1, wherein said 17α-vinyloestra-2,5(10)-dien-3,17β-diol 3-enol ether is reacted in solution in an aqueous lower alkanol at room temperature with oxalic acid.

6. A method of making 17α-vinyloestr-5(10)-en-17β-ol-3-one comprising acting upon a solution of a Δ$^8$-dehydrooestrone 3-enol ether with acetylene in the presence of potassium t-butoxide to form a Δ$^8$-dehydro-17α-ethinyloestradiol 3-enol ether, acting upon said Δ$^8$-dehydro-17α-ethinyloestradiol 3-enol ether with an alkali metal and liquid ammonia to simultaneously reduce the 17α-ethinyl group to a 17α-vinyl group, reduce the 8–9 double bond and reduce the aromatic A ring to a diene ring, and acting upon a solution of the resulting 17α-vinyloestra-2,5(10)-dien-3, 17β-diol 3-enol ether with oxalic acid in aqueous lower alkanol solution to form 17α-vinyloestr-5(10)-en-17β-ol-3-one.

7. A method as claimed in claim 6, wherein said Δ$^8$-dehydro-17α-ethinyloestradiol 3-enol ether is reduced by adding an alkali metal and liquid ammonia to a solution thereof to form an alkali metal amide in situ, followed by adding ethanol or t-butanol.

8. A method for making 17α-vinyloestra-2,5(10)-dien-3,17β-diol 3-enol ether comprising acting upon Δ$^8$-dehydro-17α-ethinyloestradiol 3-enol ether with an alkali metal and ammonia to simultaneously reduce the 17α-ethinyl group to a 17α-vinyl group, reduce the 8–9 double bond and reduce the aromatic A-ring to a diene ring.

9. A method as claimed in claim 8, wherein said Δ$^8$-dehydro-17α-ethinyloestradiol 3-enol ether is reduced by adding an alkali metal and liquid ammonia to a solution thereof to form an alkali metal amide in situ, followed by adding ethanol or t-butanol.

10. A method as claimed in claim 9, wherein the alkali metal is lithium.

References Cited by the Examiner

UNITED STATES PATENTS

| | | | |
|---|---|---|---|
| 2,655,518 | 10/1953 | Colton | 260—397.4 |
| 2,691,028 | 10/1954 | Colton | 260—397.5 |
| 2,983,735 | 5/1961 | De Ruggieri et al. | 260—397.4 |
| 3,202,686 | 8/1965 | Hughes et al. | 260—397.45 |

OTHER REFERENCES

Djerassi et al.: J.A.C.S. 71, pages 3962–66 (page 3963 relied on), 1949.

LEWIS GOTTS, *Primary Examiner.*

HENRY A. FRENCH, *Assistant Examiner.*